United States Patent [19]

Yamada et al.

[11] 4,322,145

[45] Mar. 30, 1982

[54] SHUTTER DEVICE FOR CAMERA

[75] Inventors: Tateo Yamada; Isao Harigaya, both of Yokohama; Yukio Ogawa, Kawasaki; Michio Hirohata, Inagi, all of Japan

[73] Assignee: Canon Kabushiki Kaisha, Tokyo, Japan

[21] Appl. No.: 141,279

[22] Filed: Apr. 18, 1980

[30] Foreign Application Priority Data

Apr. 26, 1979 [JP] Japan ................................. 54-51745

[51] Int. Cl.³ .......................... G03B 7/08; G03B 9/08
[52] U.S. Cl. .................................. 354/50; 354/60 R; 354/234
[58] Field of Search .................. 354/230, 234, 50, 51, 354/60 R

[56] References Cited

U.S. PATENT DOCUMENTS 3,654,845  4/1972  Fahlenberg et al. ................ 354/234
3,987,473 10/1976  Kondo ................................. 354/234
4,051,499  9/1977  Kondo ................................. 354/234

Primary Examiner—Russell E. Adams
Attorney, Agent, or Firm—Toren, McGeady & Stanger

[57] ABSTRACT

The present invention relates to an electromagnetically driven shutter device for camera, so designed that a detecting means for detecting the displacement speed of the shutter member and the power supply means for supplying the driving energy to the shutter member are provided in such a manner that the output of the power supply means is varied in accordance with the output of the detecting means so as to maintain the displacement speed of the shutter member constant.

14 Claims, 10 Drawing Figures

SHUTTER DEVICE FOR CAMERA

BACKGROUND OF THE INVENTION

The present invention relates to a mechanism for controlling the shutter speed of the electromagnetically driven shutter device with high accuracy.

So far there exsist several kinds of electromagnetically driven shutter devices. However, in all cases there take place the fluctuation of the load and so on due to the friction at the shafts of the shutter blades, the friction between the shutter blades (curtains) or the loose engagement between the mechanical members when the shutter is opened respectively closed. These load fluctuations often cause errors in the displacement speed of the shutter members, whereby especially when the shutter is at the same time made use of as diaphragm the actual operation often deviates largely from the desired optimal program diagram.

Namely, a proper exposure cannot be obtained, whereby especially the error of the high speed shutter operation is too large to realize the high speed exposure.

SUMMARY OF THE INVENTION

The present invention relates to a shutter device for a camera without having such shortcomings as of the conventional technics.

An important object of the present invention is to offer an electromagnetically driven shutter device for a camera so designed that the shutter speed can be controlled at high accuracy regardless of the construction of the device.

Another object of the present invention is to offer a shutter device by means of which a precise high speed shutter can be realized with simple construction although the high speed shutter is likely to have a large error due to the mechanism.

Further another object of the present invention is to offer a shutter device so designed that the shutter device serving at the same time as diaphragm is operated at a certain determined speed so as to be able to obtain the predetermined exposure operation in a precise way.

In accordance with the embodiment of the present invention, a part of each of a plural number of shutter blades is born on the camera body, while another part of each shutter blade is connected to a ring-shaped body called sector ring rotatable around the photographing optical axis in such a manner that in accordance with the rotation of the sector ring the photographing optical path is opened respectively closed by means of the shutter blades, while on the sector ring coils or conductor print patterns as driving conductor members are arranged, whereby a stationary magnetic field formed by means of a permanent magnet as magnetic field forming means is let to work upon the driving conductor member in such a manner that the sector ring is rotated by controlling the current running through the driving conductor member so as to drive the shutter blades by means of the rotation displacement of the sector ring.

Further, as the detecting means in accordance with the present invention, a magnetism sensing member such as detecting coil or detecting conductor print pattern in case of the embodiment of the present invention is separately arranged on the sector ring so as to induce an electromotive force proportional to the rotation speed of the sector ring in such a manner that in accordance with the electromotive force induced by means of the detecting means the power supply to the driving coils or the driving conductor print patterns on the sector ring is controlled in order to control the rotation speed of the sector ring, namely the displacement speed of the shutter speed at the predetermined speed.

As explained above, in case of the shutter device in accordance with the present invention the electromagnetic force is made use of as driving force of the shutter device, while a detecting means for detecting the shutter speed is provided in such a means the electromagnetic force is controlled by means of the output of the detecting means so as to obtain a predetermined shutter speed. Therefore, regardless of the construction of the electromagnetically driven shutter the shutter speed can be controlled at high accuracy, while a proper exposure amount can easily be obtained in case the shutter blades act at the same time as diaphragm.

Although the error of the high speed shutter is apt to be large due to the mechanism, a precise high speed shutter can be realized very easily by means of the shutter device in accordance with the present invention.

In case the above electrically driven shutter is the diaphragm shutter so designed that conductors are arranged on a ring-shaped sector ring having the center on the photographing optical axis in such a manner that when a current is supplied a rotation force is produced in the sector ring, it is sufficient to detect only the rotation speed of the sector ring in order to detect the displacement speed of the shutter member so that the detection of the displacement speed of the shutter speed is easy no matter when the shutter is opened or closed. On the other hand, in case of the focal plane shutter, it is necessary to detect the speed of not only the leading curtain but also the tail curtain, which is troublesome.

In case the above detecting means consists of a magnetism sensing member, the electromagnetism can be efficiently made use of as shutter driving power with a simple construction.

DESCRIPTION OF THE PREFERRED EMBODIMENTS

Below the present invention will be explained in detail in accordance with the accompanying drawings of the embodiments of the present invention.

Figure 1:
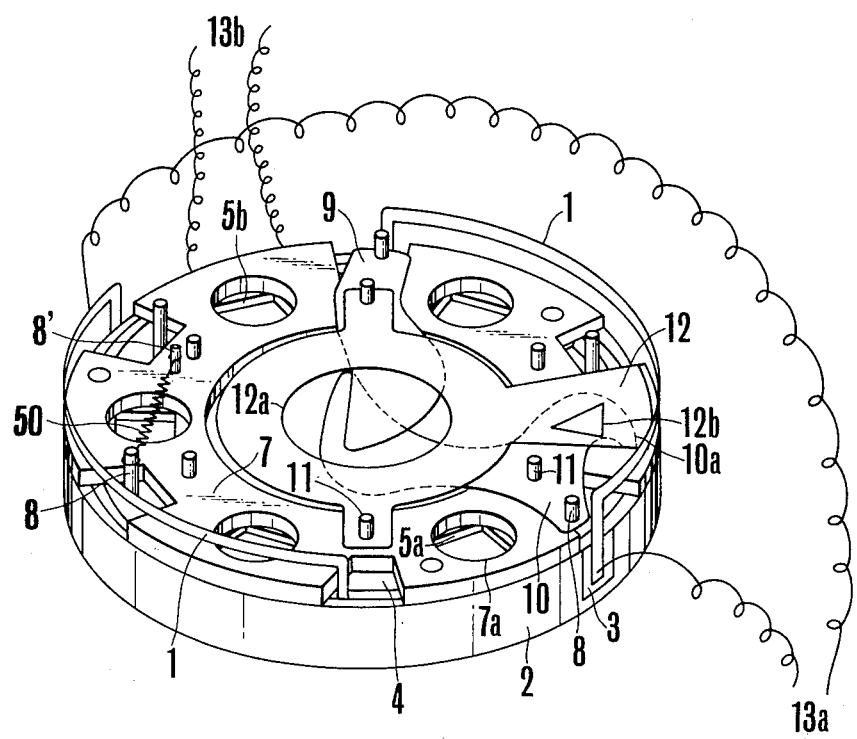
FIG. 1 shows an embodiment of the shutter device for a camera in accordance with the present invention in perspective view.
Figure 2:
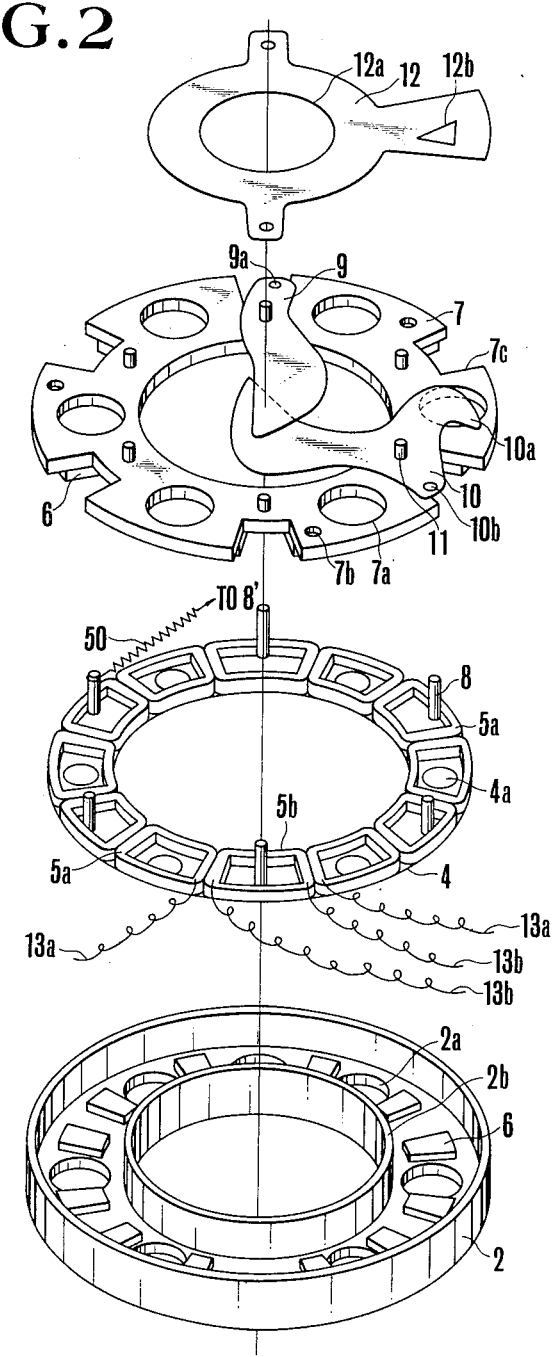
FIG. 2 shows the elements of the shutter device shown in FIG. 1 in perspective view.

FIG. 1 shows an embodiment of the present invention in perspective view, while FIG. 2 shows the elements constituting the embodiment. Hereby, 1 are connecting wires serving at the same time as spring, being cemented on the cover 2 through an insulation sheet 3 and consisting of conductive substance with slight elasticity such as phosphor bronze, whereby they are arranged diametrically. They are electrically connected to the coils 5a arranged on the sector ring 4 so as to be mechanically secured on the sector ring 4.

50 are respectively tension coil springs arranged between pins 8 provided on the sector ring 4 and pins 8' provided on the base plate 7 so as to urge the sector ring 4 along the direction along which the shutter is closed. 2 is the cover consisting of yoke material such as electrical wrought iron so as to constitute the yoke of the magnetic circuit constructed with the magnet 6 together with the base plate 7. Further, the cover 2 and the base plate 7 constitute the casing for the shutter device. Further, there are provided small holes 2a at the bottom so as to allow the passage of the light beam or the shafts. In case of the present invention, 6 holes are arranged for positioning of the magnet. The large central hole 2b is the photographing optical path.

3 are insulation sheets consisting of thin material such as ABS. 4 is the disc-shaped sector ring consisting of non-magnetic metal or plastic material, having 11 coils 5a as driving conductor members and 1 coil 5b as detecting means on the surface, whereby the sector pins 8 are provided at the center of the every second coil, namely at 6 points along a circle at the angular distance 60° between the adjacent coils. Further at each center of the coils having no sector pins there is provided one hole 4a, namely altogether 6 holes for allowing the passage of the light beam or the shafts. Hereby, it goes without saying that 12 driving coils 5a can be arranged in such a manner that the coil 5b is provided on one of the driving coils.

Figure 3:
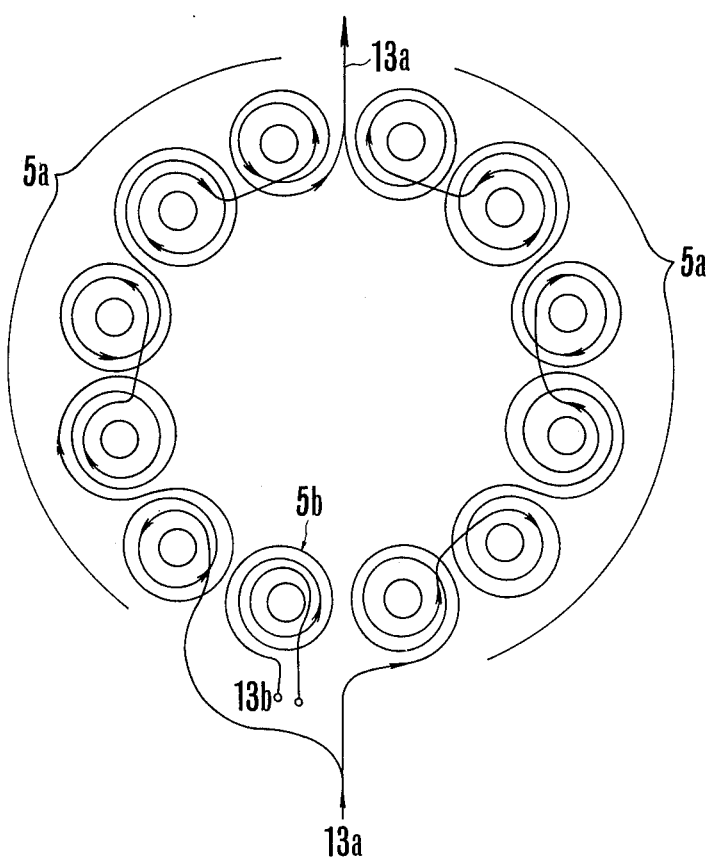
FIG. 3 shows the electrical wiring between the coils 5a as driving conductor means and the coil 5b as detecting magnetism sensing member shown in FIGS. 1 and 2.

5a and 5b are fan-shaped trapezoidal coils consisting of conductive material such as copper. Further, as is shown in FIG. 3, 11 driving coils 5a are wired independently from the sector ring rotation speed detecting coil 5b.

6 are the magnet for producing magnetic field with a certain determined intensity at certain determined portions in the case for the shutter device, consisting of rare-earth element in case of the present embodiment, whereby a magnetic flux density as high as 7K-3K gauss can be obtained with B/H=2-0.5 so as to realize a thin and light magnet. Further, a higher flux density can efficiently be obtained with a magnet consisting of two rare-earth element sheets facing to each other than with a magnet consisting of one single sheet, so that in case of the present embodiment, as is shown in FIG. 4, 12 out of the 24 magnets are arranged on the cover 2 and the remaining 12 are arranged on the base plate in such a manner that the polarity of a magnet is inversed to that of the adjacent magnets while that of a magnet is same as that of the one above the magnet, whereby the magnets are not arranged on the holes 2a and 7a in the cover 2 and the base plate 7 so as to allow the passage of the light beam and the shafts.

Figure 4A:
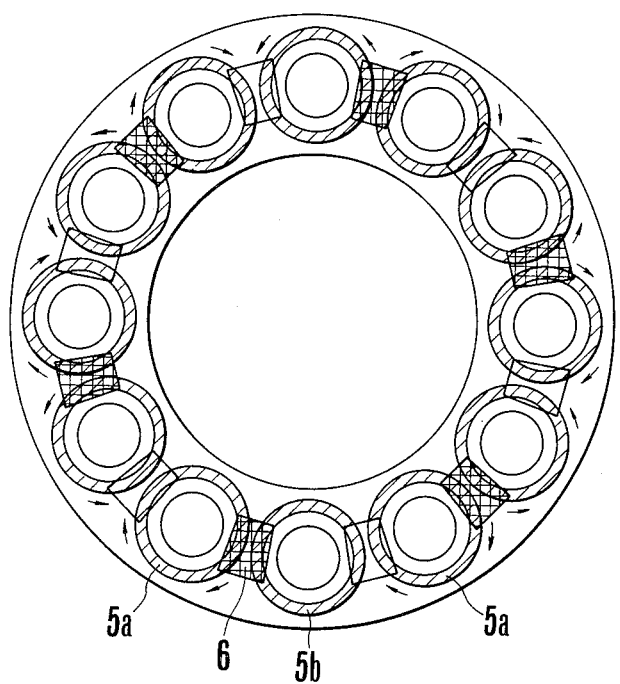
FIGS. 4(a) and 4(b) show the arrangement of the permanent magnets 6 with reference to the coils 5a and 5b in FIGS. 1 and 2.
Figure 4B:
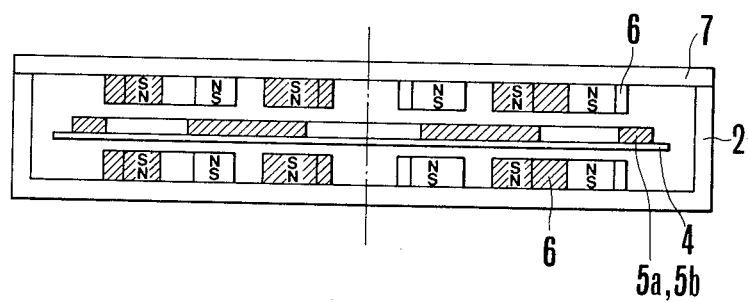

Further, the magnetization is made along the direction of the thickness of the sheet as is shown in FIG. 4(b).

The base plate 7 is provided with 6 notches 7c for the sector pins 8, 7 holes 7a for allowing the passage of the light beam and the shaft and 6 shafts 11 serving as rotation shafts of the shutter blades 9 and the blades 10 serving as shutter blades and subsidary diaphragm blades. The central large hole serves as the photographing optical path. Further, the base plate is provided with several holes 7b for the screws for securing the shutter on the camera, consisting of a material like electrical wrought iron so as to serve as member for constituting the yoke of the magnet 6.

8 are the sector pins as transmission means for transmitting the motion of the sector to the shutter blades 9 or the blades 10, being secured on the sector ring 4 and consisting of non-magnetic material such as phosphor copper.

9 are the shutter blades being rotatable around the shaft pins 11 so as to open respectively close the aperture 12a on the aperture control plate 12 in order to control the exposure.

Further, the blade 9 consists of thin sheets such as of plastic material whose rigidity is large as compared with weight. The holes into which the sector pins are movably engaged are long holes as is the case with the holes 10b of the blades 10 so as to absorb the difference between the rotation radius of the sector pins and that of the holes.

10 are the shutter-diaphragm blades acting in the same manner as the shutter blades 9, while the subsidary diaphragm portions 10a work upon the subsidary diaphragm hole 12b on the control plate 12 so as to control the light beam incident upon the light sensing element for controlling the exposure.

The blades 10 at the same time act as shutter blades so that there is a certain determined relation established between the two aperture opening areas. 11 are the 6 rotation shafts for the shutter blades 9 and the blades 10, being arranged on a circle at an equal angular distance between the adjacent shafts.

12 is the largest aperture control plate, provided with at least two holes to be positioned by means of the shaft pins 11, the aperture 12a for the photographing light beam and the subsidary aperture 12b compensated so as to control the exposure. Further, in order to avoid the reflection from the plane, it consists of thin steel plate or the like.

13a are the lead-in wires for the driving coils 5a and 13b is the lead-in wire for the detecting coil 5b for detecting the rotation speed of the sector ring 4, whereby both wires are connected to the power supply circuit.

The relation between the coils 5a, 5b and the magnets 6 are shown in FIGS. 4(a) and 4(b). The magnets excited along the direction of the thickness of the plates are, as explained above, arranged in such a manner that the polarity of a magnet is inversed to that of the adjacent ones and the polarity of a magnet is also inverted to that of the one above the magnet.

Hereby, the center of a coil is positioned nearly in the middle between the upper and the lower magnet. Further, in case of the present embodiment, the magnets and the coils are arranged in such a manner that a part of the both ends along the circumferential direction of each magnet 6 is superposed on a part of coils. Hereby, the reason why a coil is shaped trapezoidal is to concentrate the radial current in a coil 5 in the narrow magnetic field.

When a current flows from the one end to the other end of the lead-in wire 13a, the radial current in the coils are centripetal and centrifugal alternatively. The directions of the radial current in the coils and that of the magnetic field produced with the current are inversed alternatively, the sector rotates along one direction when a current flows.

Figure 5:
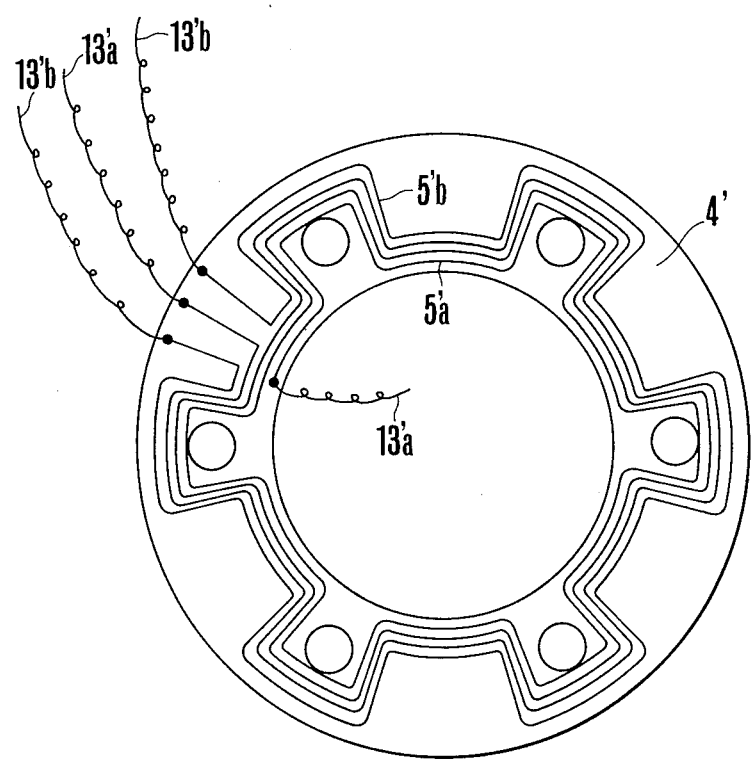
FIG. 5 shows another embodiment of the driving conductor member and the detecting means in accordance with the present embodiment.

FIG. 5 shows another embodiment of the present invention, whereby the sector ring and the coils as driving conductor members are made of printed circuit, whereby the radial current in the sector ring 4' are centripetal and centrifugal alternatively, whereby the driving coil 5'a for rotation power is arranged inside of the sector ring 4', while outside of the sector ring 4' the rotation speed detecting coil 5'b is arranged.

As is shown in FIG. 2, the holes in the cover, the base plate, the sector ring 4 and in the coils 5a and 5b along a circle are brought into alignment when these members are assembled so as to allow the passage of the light beam, the shafts, the lead-in wires and so on. Namely, the holes can be made use of as spaces for the shafts connecting the optical systems, the optical path for the subsidary aperture, the lead-in wires and so on. Namely, it is possible that one of the holes can be shaped so as to be used as subsidary aperture hole and covered with non-permeable cover in such a manner that the sector itself is used as subsidary aperture.

Figure 6:
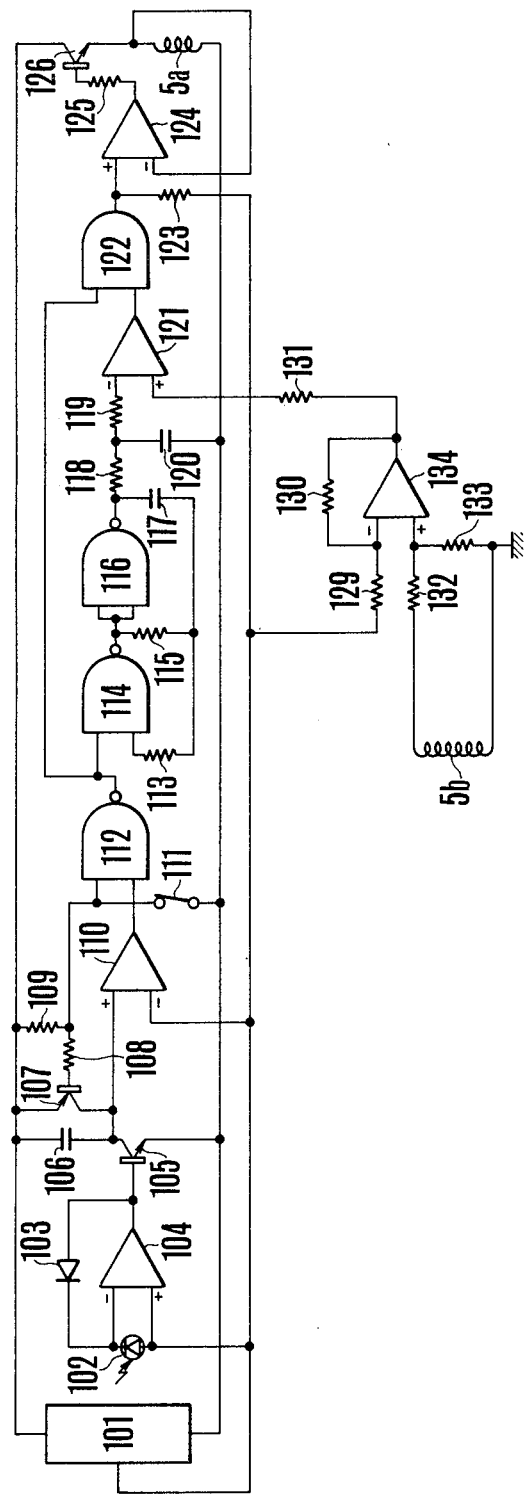
FIG. 6 shows the driving circuit for the electromagnetically driven shutter device acting at the same time as diaphragm in accordance with the present invention.

FIG. 6 shows an example of the power supply control circuit for the electromagnetically driven shutter of the present embodiment, whereby 101 is a constant voltage source, 102 is the light sensing element for sensing the light beam coming from the object to be photographed, 103 is a logarithmic diode, 104, 124 and 134 are the operational amplifiers, 110 and 121 are the comparators, 105, 107 and 126 are the transistors, 112 and 122 are the AND gates and 114 and 116 are the NAND gates. The transistor 105 and the condenser 106 constitute a timer circuit whose time constant varies in accordance with the brightness of the object to be photographed, while the transistor 107 and the resistances 108 and 109 constitute the count start circuit. The switch 111 is operationally engaged with the shutter release so as to actuate the above mentioned count start circuit, whereby along with the pushing down of the switch the transistor 107 is brought into the switched off state, while the condenser 106 is charged with a current corresponding to the brightness of the object to be photographed. Then, the charge voltage is compared with the standard voltage of the constant voltage source 101 in the comparator 110 in such a manner that the voltage becomes lower than the standard voltage the output of the comparator is inverted out of the H level into the L level. The AND gate 112 produces at the output terminal a H level signal during the time, in which the output of the comparator 110 changes from the H level into the L level when the count switch 111 is opened, namely only during the time in which the above mentioned timer circuit is in operation.

The NAND gates 114 and 116, the resistances 113 and 115 and the condenser 117 constitute an oscillation circuit, which operates only while the output of the above mentioned AND gate 112 is H level.

The resistances 118 and 119 and the condenser 120 constitute an integration circuit, which convert rectangular output of the above mentioned oscillator triangle one.

The coil 5b is the above mentioned detecting coil, which along with the closing of the electromagnetic shutter, crossed the flux of the permanent magnet so as to induce a voltage to be supplied to the non-investing input terminal of the operational amplifier 134 and, then, compared with the standard voltage from the constant voltage source 101, whereby the output is delivered to the comparator 121. Consequently, the duty cycle of the output of the oscillator is varied in accordance with voltage induced in the above mentioned detecting coil 5b. For example, when the closing time of the shutter is early, the voltage induced in the detecting coil 5b is high, and the duty cycle of the output of the oscillator is short.

The gate 122 allows the passage of the output of the oscillator since the closing of the switch 111 till the output of the comparator 110 becomes L level. The operational amplifier 124, the resistance 125 and the transistor 126 constitute a circuit for supplying a current to the above mentioned electromagnetic coil 5a.

Further, to the output of the AND gate the output of the constant voltage source 101 is connected through the resistance 123 so as to be connected to the non-inversing input of the operational amplifier 124 so that when the output of the gate 122 is H level the output of the above mentioned constant voltage source 101 is delivered to the non-inversing input of the operational amplifier 124, while when the output of the gate 122 is L level 0 volt is delivered to the non-inversing input of the operational amplifier 124. The transistor 126 is a power transistor to be brought into the switched on state respectively the switched off state in accordance with the output of the operational amplifier 124, whereby the voltage between the coil 5a and the transistor 126 is delivered to the inversing input of the above mentioned operational amplifier 124.

In this way, the voltage between the both terminals of the coil 5a is always equal to the standard voltage of the constant voltage source so that the voltage for driving the coil 5a varies between the 0 volt and the standard voltage.

Below the operation of the electromagnetically driven shutter in accordance with the present embodiment will be explained in detail.

In the electrical circuit shown in FIG. 6, along with the pushing down of the release button not shown in the drawing, the switch 111 is opened so as to bring the transistor 107 in the switched off state. At this time the potential at the non-inversing input of the comparator 110 is higher than that at the inversing input so that the output of the comparator 110 is H level. Because the switch 111 is in the opened state the other input terminal of the AND gate 112 is at H level so that the output is H level. Thus, the oscillation circuit consisting of the NAND gates 114 and 115, the resistances 113 and 115 and the condenser 117 starts to operate, whereby the signal is transmitted through the comparator 121, the AND gate 122, the operational amplifier 124 and the transistor 126 so as to start to pulse drive the coil 5a. Hereby, by means of the arrangement of the driving coils 5a and the magnet 6 shown in FIG. 4, the sector ring 4 is electromagnetically driven along the direction along which the shutter is opened, whereby the sector pins 8 rotate along with the rotation of the sector ring 4 so that the shutter blades 9 and the blades 10 rotate around the shafts 11, while the light beam coming from the object to be photographed through the subsidary aperture opening 12b and the subsidary aperture portion 10a is incident upon the light sensing element 102 shown in FIG. 6. Then, a current corresponding to the brightness of the object to be photographed flows to the condenser 106 so that after the lapse of a time corresponding to the brightness of the object to be photographed the potential at the non-inversing input terminal of the comparator 110 is lower than the level of the standard voltage, when the output of the comparator 110 becomes L level. During this time, pulses are supplied from the oscillator in the circuit to the coil 5a so as to control the shutter opening time by means of the subsidary diaphragm.

Further, by means of the voltage induced in the detecting coil 5b during this shutter opening time the duty ratio of the pulse supply is varied so as to carry out the servo control.

Namely, for example, when the rotation speed of the sector ring is higher than the determined one, the speed at which the detecting coil 5b crosses the flux is high and, therefore, the induced voltage is higher than the determined, so that the duty ratio of the pulse supply to the electromagnetic coil 5a becomes small, while on the other hand when the shutter opening speed is low the voltage induced in the detecting coil 5a is lower than the determined value and the duty ratio of the pulse supply becomes large in such a manner that the shutter opening operation is always carried out at the determined speed. Hereby, the shutter closing operation is carried out by means of the spring 50 as has been explained before.

Although so far the present invention has been explained in accordance with the so called moving coil type, its goes without saying that the present invention is not necessarily be limited to the speed control of the electromagnetically driven shutter of such a specific type. For example, the coils or the conductor point pattern as driving conducting member may be secured on the camera body while the permanent magnets may be movable in such a manner that the permanent magnets are operatively engaged with the shutter blades. One of the most important substance of the present invention lies in the so called electromagnetically driven shutter device, so designed that a detecting means for detecting the shutter speed is provided in such a manner that the output of the detecting means is fed back so as to control the shutter speed at a high accuracy.

Consequently, as detecting means for detecting the shutter speed for example, a Hall element may be made use of. In this case, for example, the Hall element is arranged on the member which can be operatively engaged with the shutter blades in such a manner that the magnetic field working upon the Hall element varies in accordance with the displacement amount of the shutter blades, whereby the output of the Hall element is differentiated so as to obtain an electrical signal corresponding to the shutter speed.

Further, in case of an embodiment in accordance with the present invention, as is shown in FIG. 6, the current flowing through the driving coil is synchronized in such a manner that a more stabilized and controlable current supply is carried out. However, beside such a current supply method as mentioned above, for example, a certain determined continuous current supply is made to the driving coil through a differential amplifier while to the other input of the differential amplifier the output of the shutter speed detecting means is connected in such a manner that the current supply to the driving coil is controlled.

Further, in case of the present embodiment the closing operation of the shutter is carried out by means of springs. However, this closing operation may be electromagnetically carried out. In this case, it is sufficient to inverse the direction of the current running through the driving coil to that at the shutter closing time.

Figure 7:
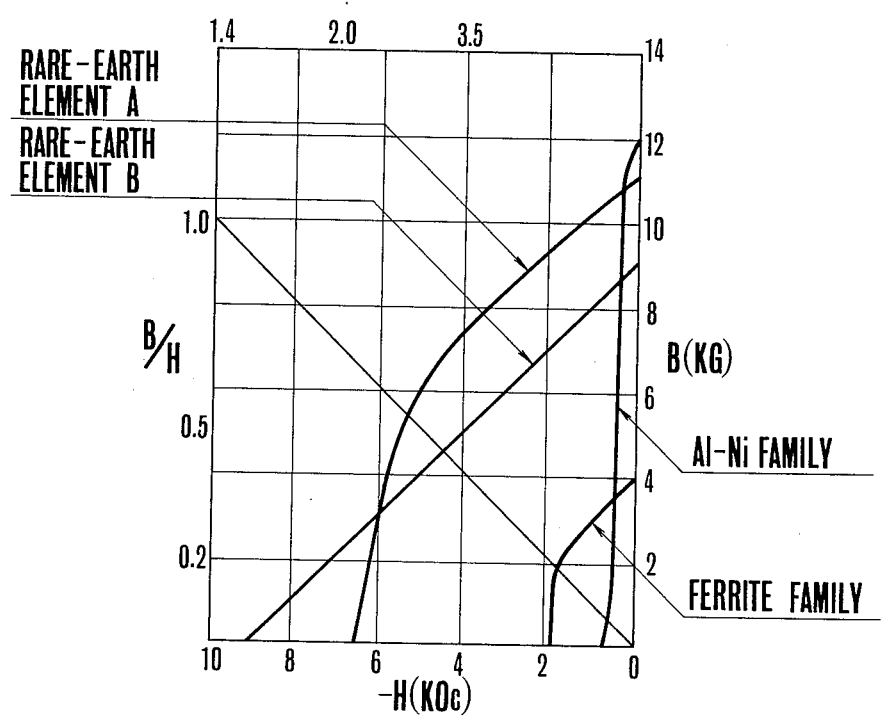
FIG. 7 shows the characteristics of the magnets 6 shown in FIGS. 1 and 2.

Even in this case, as explained above, the exposure accuracy is higher when the shutter closing time is shorter than the shutter opening time. Further, especially in case of the embodiment of the present invention, as permanent magnets the magnets not of the Al-Ni family nor the ferrite family but the rare-earth elements are made use of so that the volume of the magnetic system can be made remarkably small. Namely, as is shown in FIG. 7, when the value B/H determined with the shape of magnet and yoke is 1, 0.5K gauss is obtained for Al-Ni family and 1.5K gauss is obtained for ferrite family, while as high as 4.5K gauss can be obtained for the rare earth element B and as high as 5.5K gauss can be obtained for the rare earth element A, which enables the construction of a very efficient magnetic system.

Figure 8A:
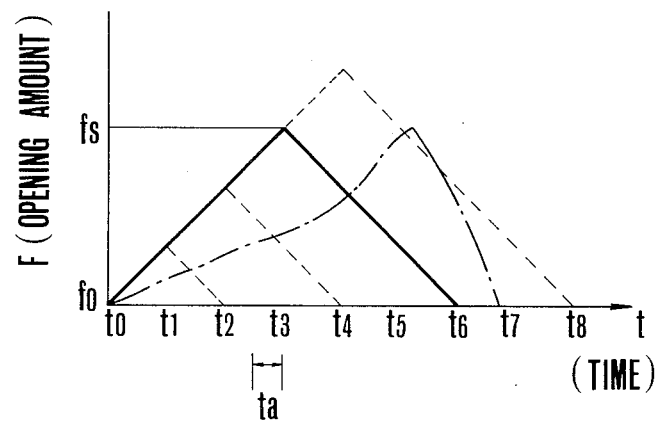
FIG. 8 shows the opening and closing characteristics of the shutter device acting at the same time as diaphragm in accordance with the present invention.
Figure 8B:
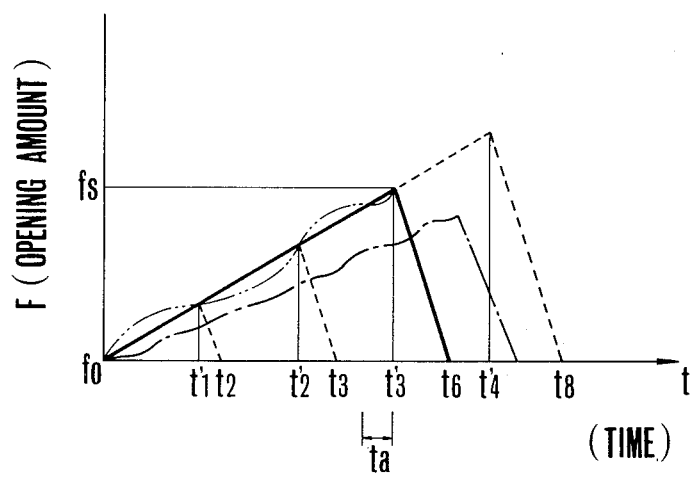

Further, in case of the present embodiment the strength of spring is made use of at the shutter closing time, whereby the shutter closing speed is selected higher than the shutter opening speed. Hereby, as is shown in FIG. 8(a) unless the shutter closing speed is made higher by means of springs, the shutter opening characteristics becomes symmetrical to the shutter closing characteristics. Now, let us consider the case that the shutter is opened up to f3, while the shutter opening and the shutter closing are carried out in t6, namely let us consider the effective exposure time of t6/2(=t3). Then, at the time point t3 the opened shutter starts to close when none spring is made use of, while when springs are made use of the shutter opening speed is lowered as is shown in FIG. 8(b), in such a manner that t'3 is the time point at which the opened shutter starts to close. Consequently, the absolute value of the time lag ta with which the shutter opening signal changes into the shutter closing signal is same in case shown in FIG. 8(a) and FIG. 8(b), the ratio of ta to t3 is smaller than that of ta to t'3. Namely, the influence of the error of the exposure amount to the proper exposure amount is smaller, which is profitable.

As has so far been explained in detail, the purpose of the present invention is to offer an electromagnetically driven shutter device, being characterized in that a detecting means for detecting the shutter speed and a power supply means for supplying the shutter driving energy are provided in such a manner that the output of the power supply means is varied in accordance with the output of the detecting means in order to keep the shutter speed always constant.

Beside the afore mentioned efficiencies, the shutter device in accordance with the present invention has the following ones.

When the energy supply by means of the above power supply means is periodically controlled, in case a power source whose voltage level is limited is made use of the supply amount can be controlled only by varying the periodical component even if the amplitude level of the supply energy is not varied, which is profitable particularly for a device such as camera whose portability is much appreciated together with handy power source. Further, a sufficient braking effect can be given to the servo mechanism so as to obtain a stabilized operation.

Further, when the duty ratio is varied in accordance with the output of the detecting means, the energy supply from the above power supply means can easily be controlled without making the supply period large even in case the shutter member with high speed is controlled, whereby a stabilized characteristics can be maintained even for the high speed shutter.

Further, the embodiments of the shutter in accordance with the present invention have the following efficiencies.

The shutter is opened by means of the electromagnetic force less the strength of springs while the shutter is closed by means of the strength of spring in such a manner that the shutter opening speed is lower than the shutter closing speed so that the programmed shutter can easily be controlled with high accuracy.

The rotation power is directly given to the sector so that the transmission loss of power can be eliminated.

The thickness of the coils along the direction of the optical axis can be made small so that the shutter can be constructed thin, whereby a strong magnetic field can be produced.

The coils move along the radial direction and not along the axial direction, so that the shutter can be constructed thin.

The weight on the sector is almost even so that even if a shock is given to the camera the sector is not rotated with inertia and, therefore, there is no fear that the shutter should be opened.

The sector is directly driven with simple mechanism, so that the time lag ta between the input of the closing electrical signal and the start of the shutter closing is about as short as 1.5 ms so that the real time light measuring control can be carried out (by means of the reflection on the film plane and so on).

The magnet consists of rare earth element so that a strong magnetic field can be obtained, while the magnet itself can be made light.

The number of the construction parts is small so that little damage takes place while the assembling is easy.

Further, the positioning by means of the holes in the cover 2, the base plate 7 and the sector 4 offer the following efficiencies.

The holes formed at the centers of the coils can be made use of as the light paths for the subsidary aperture, whereby further the front optical system can be connected to the rear optical system through the holes.

There are holes in the sector so that the sector becomes correspondingly light, whereby a quick response can be obtained.

There are holes in the cover and the base plate so that the weight of the shutter is small.

Further, the printed plate as sector ring offers the following efficiencies.

The gap can be made small so as to obtain a strong magnetic field.

The printed plate can be provided with subsidary diaphragm so as to control the exposure, so that the shutter blades can be constructed equal to each other.

When the copper plated surface of the printed plate is remained, the sector pins can be soldered.

The lead-in wire with elasticity serving at the same time to hold the sector ring offers the following efficiencies.

The breakage of wires due to the repeated load can be eliminated.

The space for the wire in loop is not necessary. It can be prevented that the shutter is left opened.

The shutter operation can be realized easily on the program diagram so that the shutter program can be adjusted easily during the adjusting step in the manufacturing process.

What is claimed is:

1. A shutter device for a camera, comprising:
   magnetic means for forming magnetic fields;
   conductor means located to be influenced by said magnetic field so that when current is supplied to the conductor means, the relative position of the conductor means and the magnetic field is varied;
   at least one shutter blade for opening and blocking a photo-taking optical path on the basis of the relative positions of said conductor means and the magnetic means;
   detecting means for detecting the displacement speed of the shutter blade; and
   control means for controlling the displacement speed of the shutter blade by controlling the amount of current through said conductor means in response to the output of the detecting means.

2. A shutter device according to claim 1, further comprising a housing, the magnetic means being fixed to the housing.

3. A shutter device according to claim 1, wherein the magnetic means is a permanent magnet.

4. A shutter device according to claim 1, wherein the detecting means is an electromagnetic sensor.

5. A shutter device according to claim 4, wherein the detecting means detects changes in the magnetic field caused by changes in the relative positions of the conductor means and magnetic means.

6. A shutter device according to claim 4, wherein the detecting means is a conductor.

7. A shutter device according to claim 1, wherein the conductor means includes a plurality of coils.

8. A shutter device according to claim 7, wherein the detecting means includes a coil fixed to the conductor means.

9. A shutter device according to claim 7, wherein the coil is a printed pattern.

10. A shutter device according to claim 1, wherein the conductor means is fixed to a rotor having a photo-taking optical path at its center.

11. A shutter device according to claim 10, wherein the shutter blade is connected to the rotor.

12. A shutter device according to claim 11, further comprising a light measuring arrangement, including means forming a light measuring optical path separate from the photo-taking optical path for controlling the amount of incident light in correspondence to the positional change of the shutter blade.

13. A shutter device according to claim 1, wherein the control means intermittently supply power to the conductor means.

14. A shutter device according to claim 13, wherein the control means changes the duty cycle of the intermittent power supply to the conductor means in correspondence to the output of the detecting means.

* * * * *